(12) United States Patent
Inoue et al.

(10) Patent No.: US 8,941,074 B2
(45) Date of Patent: Jan. 27, 2015

(54) RADIATION IMAGING APPARATUS, METHOD FOR MANUFACTURING THE SAME, AND RADIATION IMAGING SYSTEM

(71) Applicant: Canon Kabushiki Kaisha, Tokyo (JP)

(72) Inventors: Masato Inoue, Kumagaya (JP); Shinichi Takeda, Honjo (JP); Satoru Sawada, Fujioka (JP); Takamasa Ishii, Honjo (JP); Taiki Takei, Okegawa (JP); Kota Nishibe, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/957,311

(22) Filed: Aug. 1, 2013

(65) Prior Publication Data
US 2014/0042327 A1     Feb. 13, 2014

(30) Foreign Application Priority Data
Aug. 10, 2012   (JP) .................................. 2012-178920

(51) Int. Cl.
*G01T 1/20*     (2006.01)

(52) U.S. Cl.
CPC ............ *G01T 1/2002* (2013.01); *G01T 1/2018* (2013.01)
USPC ..................................... 250/370.11; 250/362

(58) Field of Classification Search
USPC ............................................. 250/362, 370.11
See application file for complete search history.

(56) References Cited

U.S. PATENT DOCUMENTS

2001/0015407 A1\*   8/2001   Tsujii ........................ 250/252.1
2011/0147602 A1\*   6/2011   Ishida et al. ............. 250/370.11

FOREIGN PATENT DOCUMENTS

JP          2003-262673 A        9/2003

\* cited by examiner

*Primary Examiner* — David Porta
*Assistant Examiner* — Abra Fein
(74) *Attorney, Agent, or Firm* — Carter, DeLuca, Farrell & Schmidt, LLP

(57) ABSTRACT

A radiation imaging apparatus, comprising a sensor panel including a sensor array on which a plurality of sensors arranged in an array form and a scintillator layer provided on the sensor array, and a unit configured to perform signal processing based on a signal from the sensor array, wherein the sensor array includes a peripheral region and a central region located inside the peripheral region, the scintillator layer is disposed over the peripheral region and the central region so as to have uniform luminance efficiency with respect to the sensor array, and the unit performs the signal processing by using only signals from sensors disposed in the central region, of signals from the plurality of sensors, output from the sensor panel.

11 Claims, 7 Drawing Sheets

RADIATION IMAGING APPARATUS, METHOD FOR MANUFACTURING THE SAME, AND RADIATION IMAGING SYSTEM

BACKGROUND OF THE INVENTION

1. Field of the Invention

The present invention relates to a radiation imaging apparatus, a method for manufacturing the same, and a radiation imaging system.

2. Description of the Related Art

A radiation image can be generated by an apparatus including a scintillator layer which converts radiation into light and a sensor array having a plurality of sensors which perform photoelectric conversion. Japanese Patent Laid-Open No. 2003-262673 discloses a technique of adding an activator agent to a scintillator layer of columnar crystals so as to cancel out the nonuniform distribution of luminance efficiency of the layer due to the nonuniform column diameters of the crystals. According to Japanese Patent Laid-Open No. 2003-262673, it is possible to form a scintillator layer having a uniform distribution of luminance efficiency.

A radiation imaging apparatus D as a reference example will be described with reference to FIGS. 1A and 1B. As exemplarily shown in FIG. 1A, the radiation imaging apparatus D can include a sensor array 20 including a plurality of sensors 21 designed to perform photoelectric conversion and arranged on a substrate 10 in the form of an array and a scintillator layer 30 formed on the sensor array 20. Referring to FIG. 1A, the arrows schematically show light generated in a region immediately above each sensor 21 in the scintillator layer 30. FIG. 1B shows the distribution of the amounts of light received by the respective sensors 21 when the radiation imaging apparatus D is irradiated with uniform radiation. An abscissa x represents an axis taken along the direction from an end portion of the sensor array 20 as an origin to the center of the sensor array 20. An ordinate y represents the amounts of light received by the sensors 21 corresponding to the abscissa x. Although the amounts of light generated in the regions immediately above the respective sensors 21 in the scintillator layer 30 are uniform, the amounts of light entering the sensors 21 at the end portion are small. That is, although the scintillator layer 30 has a uniform luminance efficiency, the amounts of light received by the respective sensors 21 are nonuniform. That is, the sensitivity of the radiation imaging apparatus D is nonuniform with respect to radiation.

SUMMARY OF THE INVENTION

The present invention has been made by the inventor in consideration of the above problem, and provides a technique advantageous to improvement of the quality of a radiation image.

One of the aspects of the present invention provides a radiation imaging apparatus, comprising a sensor panel including a sensor array on which a plurality of sensors which perform photoelectric conversion are arranged in an array form and a scintillator layer provided on the sensor array, and a unit configured to perform signal processing based on a signal from the sensor array which is output from the sensor panel, wherein the sensor array includes a peripheral region and a central region located inside the peripheral region, the scintillator layer is disposed over the peripheral region and the central region by direct vapor deposition or direct coating so as to have uniform luminance efficiency with respect to the sensor array, and the unit performs the signal processing by using only signals from sensors disposed the central region, of signals from the plurality of sensors, output from the sensor panel.

Further features of the present invention will become apparent from the following description of exemplary embodiments with reference to the attached drawings.

DESCRIPTION OF THE EMBODIMENTS

First Embodiment

Figure 1A:
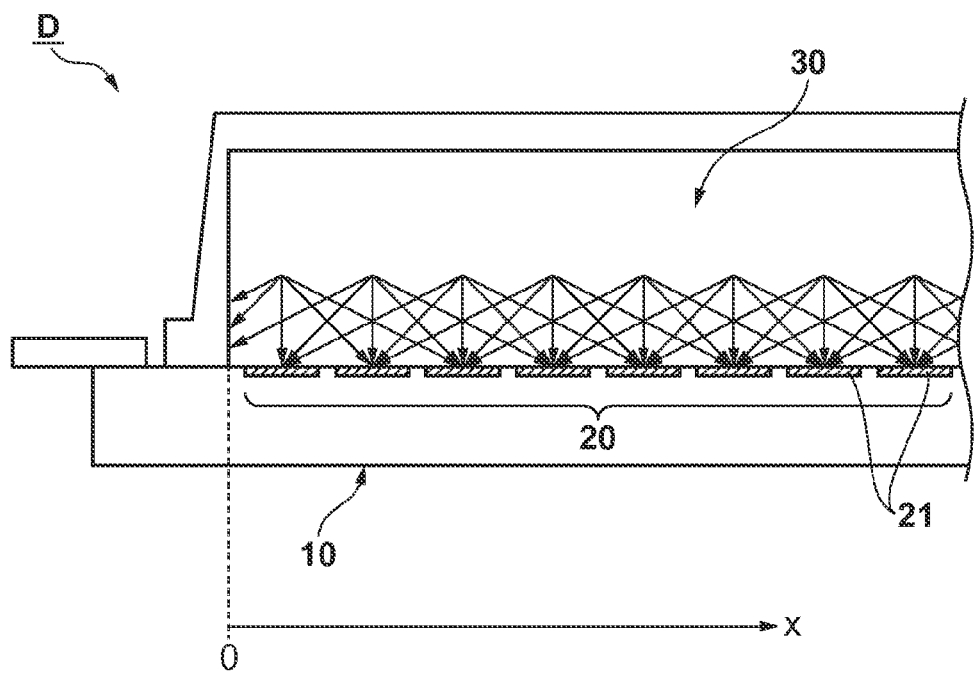
FIGS. 1A and 1B are views for explaining a radiation imaging apparatus as a reference example.
Figure 1B:
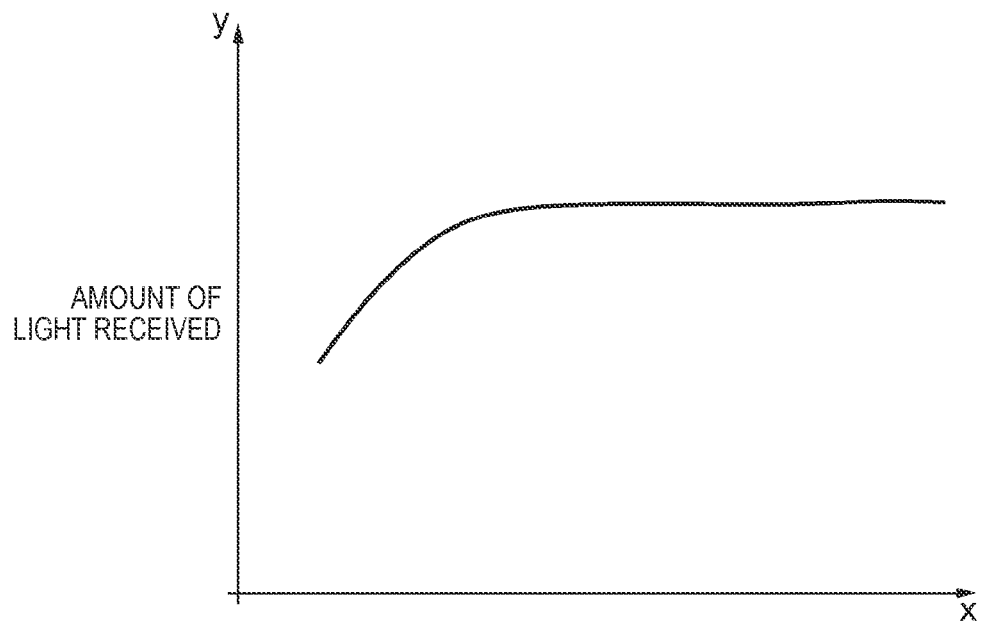
Figure 2A:
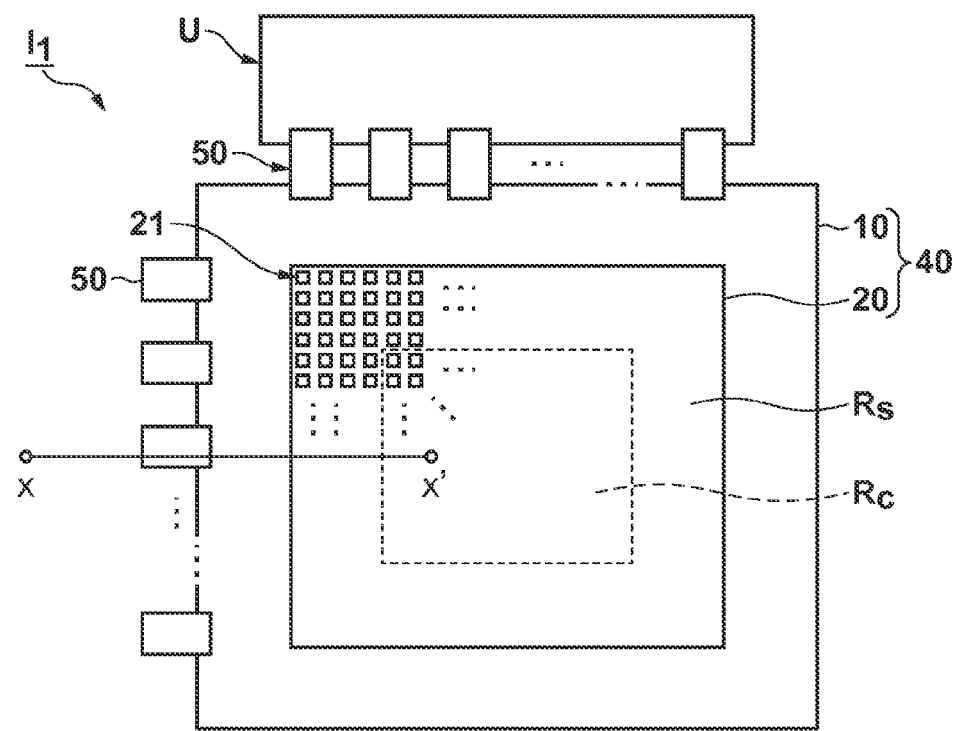
FIGS. 2A and 2B are views for explaining an example of the arrangement of a radiation imaging apparatus according to the first embodiment.
Figure 2B:
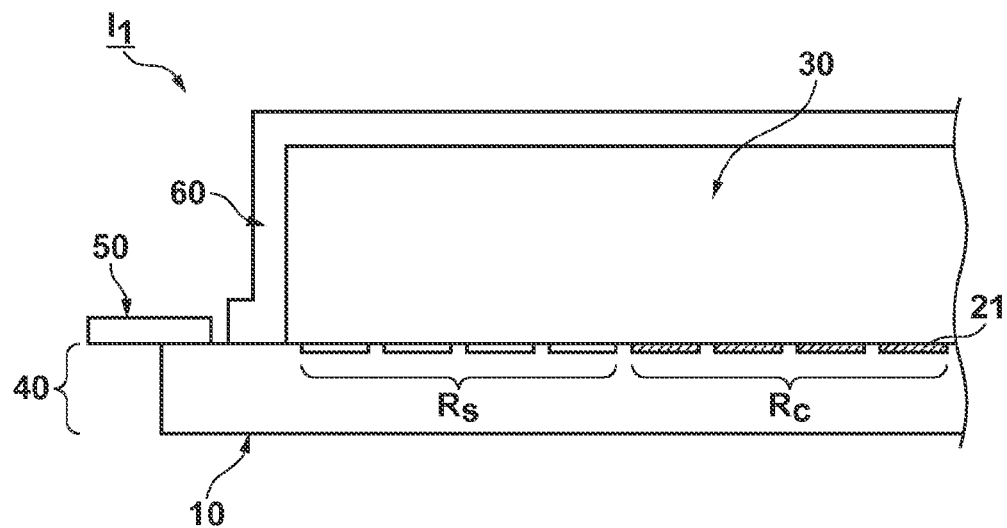

A radiation imaging apparatus $I_1$ according to the first embodiment will be described with reference to FIGS. 2A to 4B. FIG. 2A is a schematic plan view of the radiation imaging apparatus $I_1$. FIG. 2B schematically shows a sectional structure taken along a cutline X-X'. The radiation imaging apparatus $I_1$ includes a sensor panel 40 including a sensor array 20 and a scintillator layer 30 and a unit U which performs signal processing based on signals from the sensor array 20 which are output from the sensor panel 40. The sensor array 20 can be formed by arranging a plurality of sensors 21 designed to perform photoelectric conversion on a substrate 10 in the form of an array. The scintillator layer 30 has a function of converting radiation into light and can be disposed on the sensor array 20. The sensor array 20 has a peripheral region $R_s$ and a central region $R_c$. The central region $R_c$ is a region inside the peripheral region $R_s$. The sensor panel 40 includes an I/O interface 50 for driving the sensor array 20 and reading out signals from the respective sensors 21. The scintillator layer 30 can be uniformly formed on the sensor array 20. In this case, to uniformly form the scintillator layer 30 on the sensor array 20 is to form the scintillator layer 30 so as to have uniform luminance efficiency with respect to the sensor array 20. Assume that the scintillator layer 30 is regarded to have uniform luminance efficiency when variations in the amount of light, emitted by the scintillator layer 30 with respect to radiation fail within ±20%. A shield layer 60 made of a metal such as aluminum is formed on the scintillator layer 30 so as to cover the scintillator layer 30.

The unit U can generate a radiation image by performing signal processing using only signals from the respective sensors 21 in the central region $R_c$ out of the signals output from the sensor panel 40. The unit U performs this signal processing by a scheme of selecting or extracting signals from the respective sensors 21 in the central region $R_c$ from signals from the sensor array 20 or a scheme of discarding signals from the respective sensors 21 in the peripheral region $R_s$. Using only signals from the respective sensors 21 in the central region $R_c$, which have uniform characteristics, can improve the quality of the radiation image acquired by the radiation imaging apparatus $I_1$.

This embodiment exemplifies the sensors 21 corresponding to four columns (or four rows) in the peripheral region $R_s$. The boundary between the peripheral region $R_s$ and the central region $R_c$ may be changed in accordance with specifications, as needed, or may be fixed. Since the unit U does not use any signals from the respective sensors 21 in the peripheral region $R_s$ in signal processing, the respective sensors 21 in the peripheral region $R_s$ can exist as so-called dummy sensors. The unit U may control the sensor panel 40 so as not to output any signals from the respective sensors 21 in the peripheral region $R_s$. For example, a controller (not shown) belonging to the unit U can perform this control.

In addition, the scintillator layer 30 can be formed to cover the peripheral region $R_s$ and the central region $R_c$ so as to have uniform luminance efficiency with respect to the sensor array 20. The scintillator layer 30 can be formed on the sensor array 20 so as to have a uniform thickness throughout the peripheral region $R_s$ and central region $R_c$. In this case, the scintillator layer 30 is regarded to have a uniform thickness when variations in the thickness of the scintillator layer 30 fall within ±10%. It is possible to reduce the differences between the characteristics of the sensors 21 at an end portion of the sensor array 20 and the characteristics of the sensors 21 in the central region $R_c$ by effectively making the characteristics of the respective sensors 21 uniform. That is, it is possible to decrease the width of the peripheral region $R_s$ and increase the central region $R_c$ effective for the generation of radiation images.

Figure 3A:
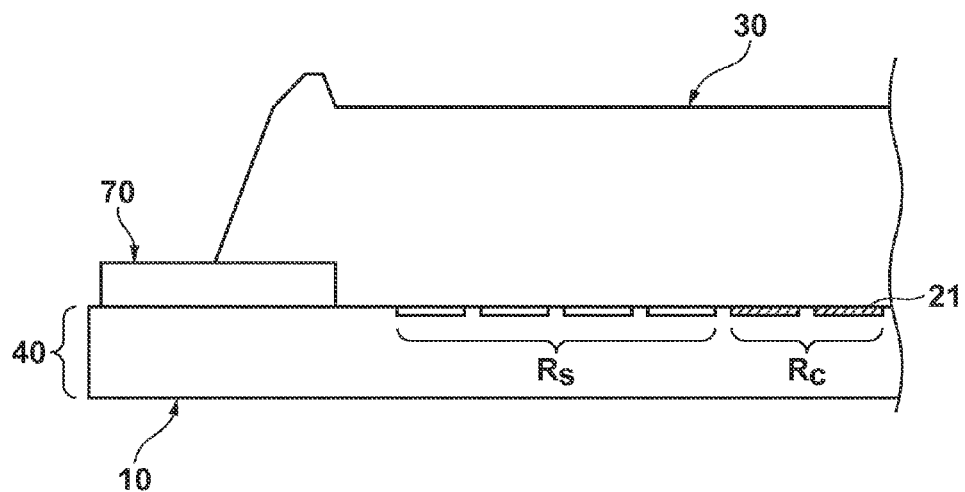
FIGS. 3A and 3B are views for explaining part of a method for manufacturing a radiation imaging apparatus according to the first embodiment.
Figure 3B:
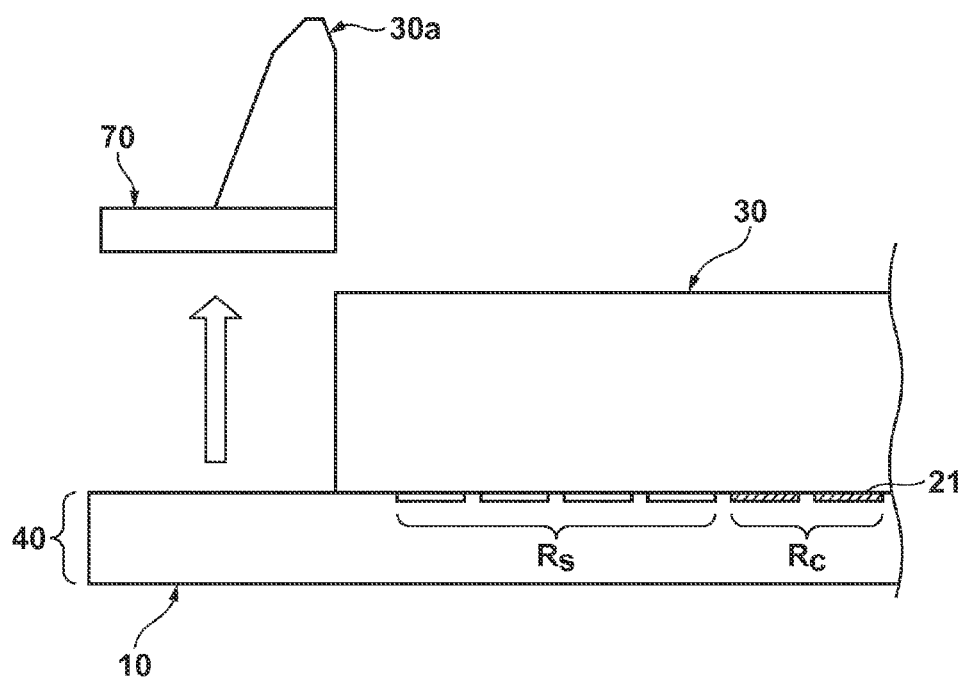

A method for manufacturing the scintillator layer 30 will be described with reference to FIGS. 3A and 3B. For example, a peeling tape 70 is disposed along the outer periphery of the sensor panel 40, as exemplarily shown in FIG. 3A, before the formation of the scintillator layer 30 by a vapor deposition method. The scintillator layer 30 is entirely formed on the sensor panel 40 including the peeling tape 70 by the vapor deposition method. The scintillator layer 30 is formed so as to have a uniform thickness throughout the peripheral region $R_s$ and the central region $R_c$. Typically, this step can be performed by using a material obtained by doping TlI as an activator agent in CsI as a base component. Subsequently, as exemplarily shown in FIG. 3B, a portion 30a of the scintillator layer 30 which is located outside (at an end portion) of the peripheral region $R_s$ and is nonuniform in thickness is removed. More specifically, it is possible to remove the portion 30a by peeling the peeling tape 70. With this processing, the scintillator layer 30 can be formed on the sensor array 20 by direct vapor deposition.

Figure 4A:
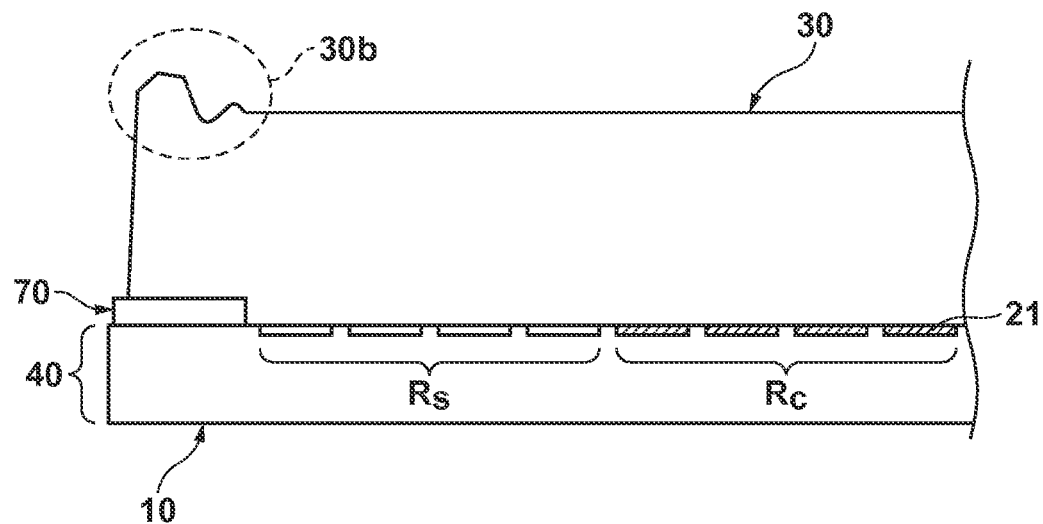
FIGS. 4A and 4B are views for explaining part of the method for manufacturing the radiation imaging apparatus according to the first embodiment.
Figure 4B:
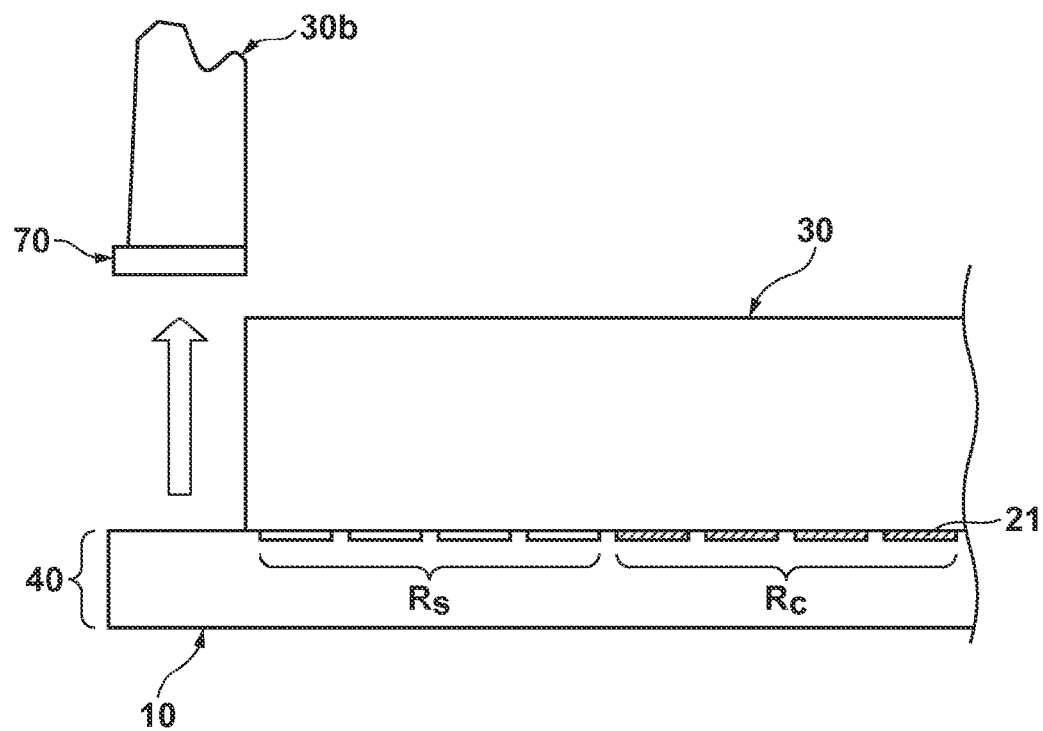

In addition, the scintillator layer 30 can be formed by direct coating. FIGS. 4A and 4B are views for explaining a method for manufacturing the scintillator layer 30 by a direct coating method. For example, after the scintillator layer 30 is formed by a slit coat method or printing method using the material obtained by liquefying a granular GOS material having a diameter of about several μm to several ten μm with a binder and a solvent, the resultant layer is heated to volatilize the solvent. In this case, since the volatilization rates at the end portion and central portion of the scintillator layer 30 differ from each other, a portion 30b with a nonuniform thickness can be formed at the end portion, as exemplarily shown in FIG. 4A. As exemplarily shown in FIG. 4B, the portion 30b may be removed by the same method as described above as that using the peeling tape 70. This can form the scintillator layer 30 on the sensor array 20 by direct coating. When directly forming the scintillator layer 30 on the sensor array 20, it is not easy to form the scintillator layer 30 with uniform luminance efficiency. It is possible to properly dispose the scintillator layer 30 by the above method.

In addition, the shield layer 60 is disposed to make the distances from the respective sensors 21 on the sensor array 20 uniform. This can reduce the differences between the parasitic capacitances generated in the sensors 21 at the end portion of the sensor array 20 and the parasitic capacitances generated in the respective sensors 21 in the central region $R_c$. That is, this can reduce the differences between the electric characteristics (response speed and the like) of the sensors 21 at the end portion of the sensor array 20 and those of the respective sensors 21 in the central region $R_c$, and hence it is possible to decrease the width of the peripheral region $R_s$ and increase the central region $R_c$ effective for the generation of radiation images. In addition, each sensor 21 in the peripheral region $R_s$ may have the same structure as that of each sensor 21 in the central region $R_c$. For example, control lines for supplying control signals to the respective sensors 21 and signal lines for transmitting signals can be arranged in correspondence with the respective sensors 21. These wiring patterns are arranged in the same layout as that of the respective sensors 21. That is, the wiring patterns preferably have translation symmetry. As described above, this can decrease the width of the peripheral region $R_s$ and increase the central region $R_c$ effective for the generation of radiation images.

As describe above, according to this embodiment, it is possible to improve the quality of the radiation image acquired by the radiation imaging apparatus $I_1$ by using only signals from the respective sensors 21 in the central region $R_c$ which have uniform characteristics. In addition, forming each end portion of the sensor array 20 into the same structure as that of the central region $R_c$ can decrease the width of the peripheral region $R_s$ and increase the central region $R_c$ effective for the generation of radiation images, thereby improving the quality of the radiation images acquired by the radiation imaging apparatus $I_1$. In addition, this can make the adhesion properties between the sensor array 20 and the scintillator layer 30 uniform and prevent the stress generated in the sensor panel 40 from locally peeling the scintillator layer 30, thereby improving the reliability of the radiation imaging apparatus $I_1$.

Second Embodiment

Figure 5A:
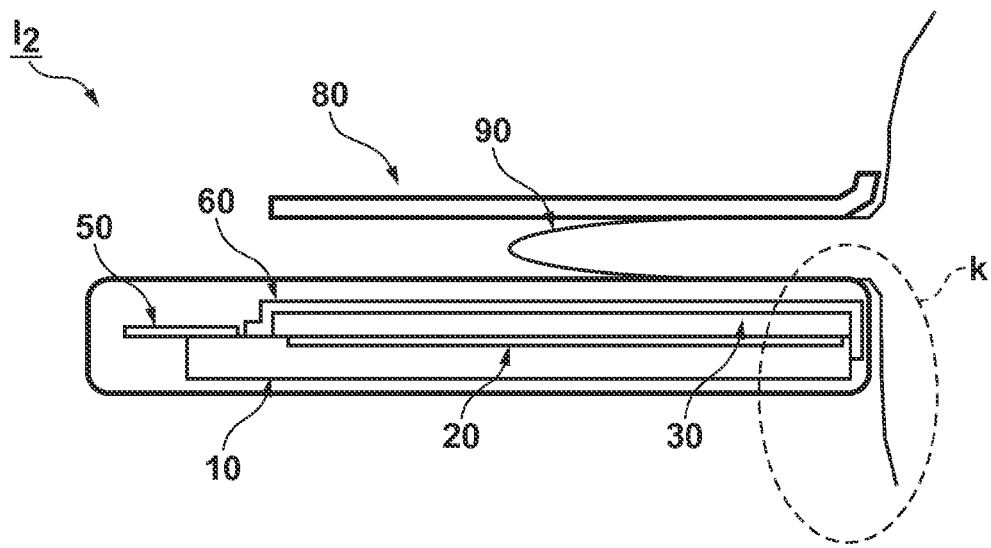
FIGS. 5A and 5B are views for explaining an example of the arrangement of a radiation imaging apparatus according to the second embodiment.
Figure 5B:
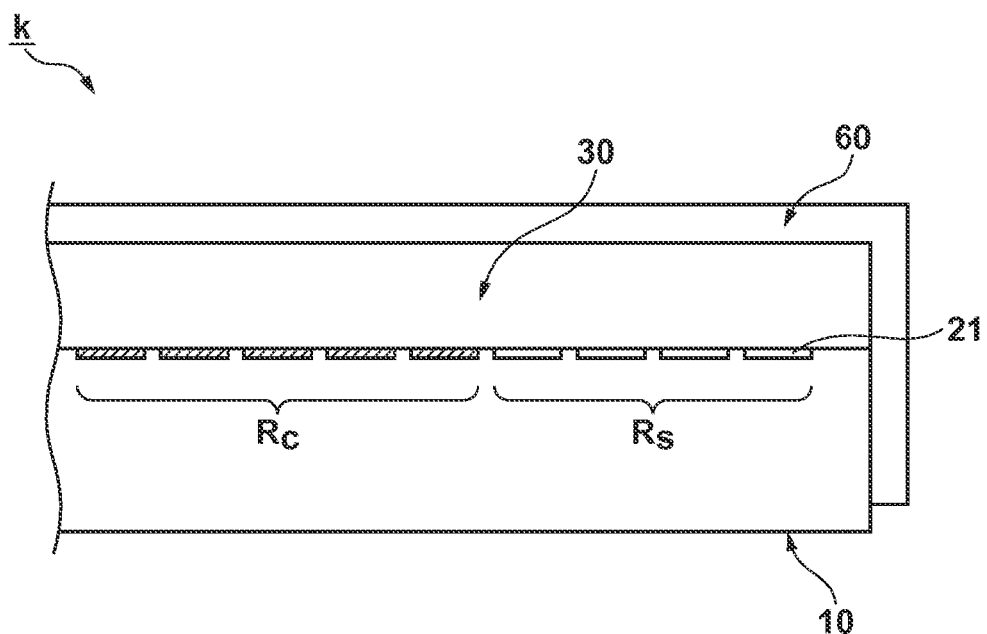

A radiation imaging apparatus $I_2$ according to the second embodiment will be described with reference to FIGS. 5A to 7. The radiation imaging apparatus $I_2$ exemplified by FIG. 5A can be used as, for example, a mammography apparatus. A description of reference numerals, of the reference numerals in FIG. 5A, which are the same as those used in the first embodiment will be omitted. The radiation imaging apparatus $I_2$ can generate a radiation image by irradiating a breast 90 of an object which is pressed by a pressure plate 80 with radiation. FIG. 5B is an enlarged view of a region K shown in FIG. 5A. In this embodiment as well, since the characteristics of each sensor 21 at an end portion of a sensor array 20 differ from those of each sensor 21 in a central region $R_c$, it is possible to perform signal processing by using only signals from the respective sensors 21 in the central region $R_c$ as in the first embodiment. A shield layer 60 is disposed up to a side surface of a substrate 10 so as to prevent the leakage of light from a scintillator layer 30 and shield against electromagnetic waves, unlike the shape of the shield layer in the first embodiment. The boundary between a peripheral region $R_s$ and a central region $R_c$ may be changed by a unit U in accordance with specifications, as needed, or may be fixed in the same manner as in the first embodiment.

Figure 6:
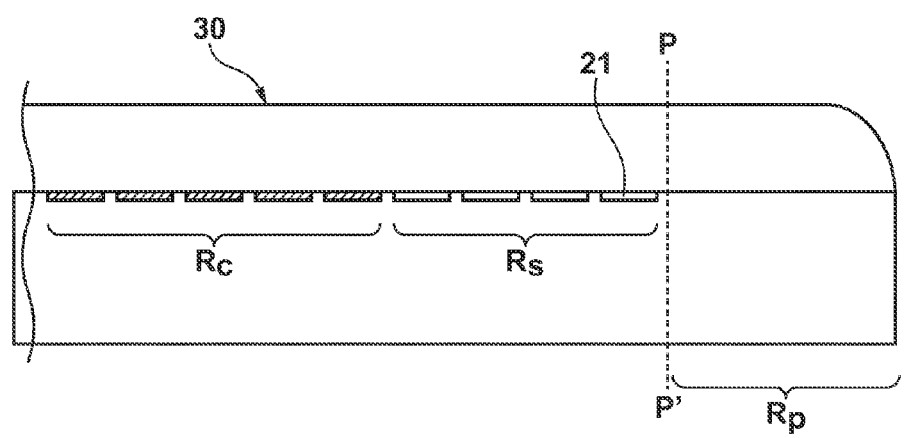
FIG. 6 is a view for explaining part of a method for manufacturing a radiation imaging apparatus according to the second embodiment.
Figure 7:
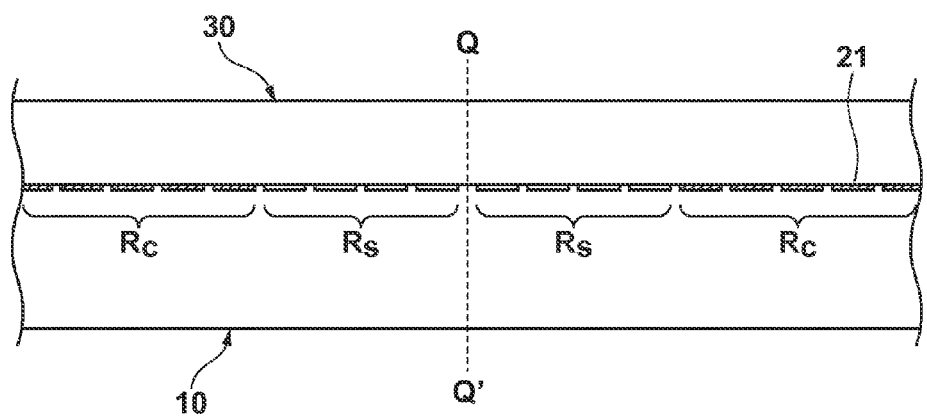
FIG. 7 is a view for explaining part of the method for manufacturing the radiation imaging apparatus according to the second embodiment.

As exemplarily shown in FIG. 6, a sensor panel 40 can be obtained by providing a preliminary region $R_p$ without the sensor array 20 on the substrate 10 in advance and cutting the resultant structure at the position of a broken line P-P' after the formation of the scintillator layer 30. Another method is to form the sensor panel 40 by forming a large-sized sensor panel first and then dividing it. More specifically, as exemplarily shown in FIG. 7, a large-sized substrate 10 is prepared in advance, and a plurality of sensor arrays 20 are formed on the substrate. The scintillator layer 30 is formed on the sensor arrays 20. The resultant structure is cut at the position of a broken line Q-Q' for each sensor array 20. According to the latter method, it is possible to efficiently acquire the sensor panels 40. As described above, like the first embodiment, this embodiment can improve the quality of the radiation images acquired by the radiation imaging apparatus $I_2$ and improve the reliability of the radiation imaging apparatus $I_2$.

Figure 8:
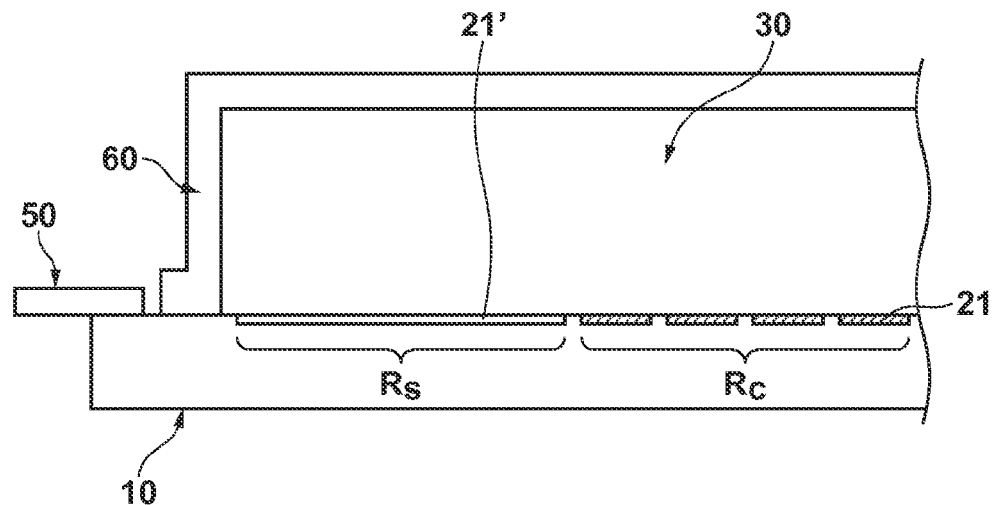
FIG. 8 is a view for explaining an example of the arrangement of another embodiment.

Although the two embodiments have been described above, the present invention is not limited to them. The objects, states, applications, functions, and other specifications of the present invention can be changed as needed, and other embodiments can implement the present invention. For example, in the first embodiment, a region of the sensors 21 corresponding to four columns (or four rows) is provided as the peripheral region $R_s$. However, as exemplarily shown in FIG. 8, sensors 21' corresponding to a size of four columns (or four rows) may be arranged. With this process, the peripheral region $R_s$ may be fixed. This form can also obtain the same effects as those described above.

Figure 9:
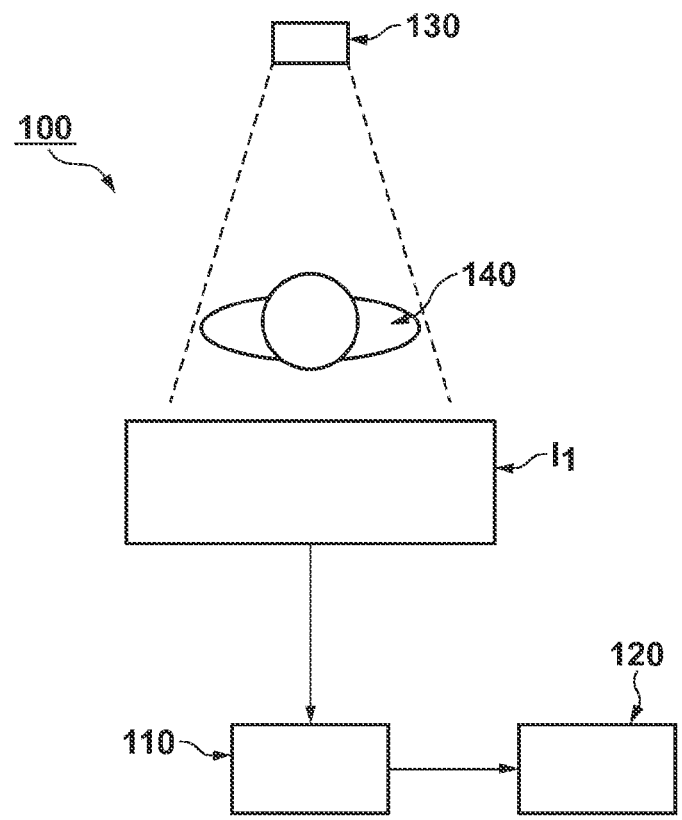
FIG. 9 is a view for explaining an example of the arrangement of a radiation imaging system.

As exemplarily shown in FIG. 9, the radiation imaging apparatuses $I_1$ and $I_2$ can be applied to a radiation imaging system 100. The radiation imaging system 100 includes, for example, the radiation imaging apparatus $I_1$, a signal processing unit 110 including an image processor, a display unit 120 including a display, and a radiation source 130 for generating radiation. The radiation (including electromagnetic waves such as X-rays, α-rays, β-rays, and γ-rays) generated by the radiation source 130 is transmitted through an object 140. The radiation imaging apparatus $I_1$ detects radiation including information inside the body of the object 140. The radiation imaging apparatus $I_1$ generates a radiation image from the information of the detected radiation and generates, for example, image data by performing predetermined information processing by an information processing unit (not shown). The display unit displays this image data. In addition, the unit U described in each embodiment may be provided in the signal processing unit 110 or the information processing unit described above.

While the present invention has been described, with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application. No. 2012-178920, filed Aug. 10, 2012, which is hereby incorporated by reference herein in its entirety.

What is claimed is:

1. A radiation imaging apparatus comprising:
a sensor panel including a sensor array on which a plurality of sensors which perform photoelectric conversion are arranged in an array form and a scintillator layer provided on the sensor array; and
a unit configured to generate a radiation image based on a signal from the sensor array which is output from the sensor panel and output the generated radiation image,
wherein the sensor array includes a peripheral region and a central region located inside the peripheral region,
wherein the plurality of sensors includes sensors disposed in the central region of the sensor array and sensors disposed in the peripheral region of the sensor array,
wherein the scintillator layer is disposed over the peripheral region and the central region by direct vapor deposition or direct coating so as to have uniform luminance efficiency with respect to the sensor array, and
wherein the unit generates the radiation image by using only signals from sensors disposed in the central region of the sensor array.

2. The apparatus according to claim 1, wherein the unit does not use the signals from sensors disposed in the peripheral region of the sensor array.

3. The apparatus according to claim 1, wherein the unit includes a controller configured to control the sensor panel so as to inhibit the sensor panel from outputting signals from the sensors disposed in the peripheral region.

4. The apparatus according to claim 1, wherein each sensor disposed in the peripheral region has the same structure as that of each sensor disposed in the central region.

5. The apparatus according to claim 4, further comprising a wiring pattern which is connected to each of the plurality of sensors,
wherein the wiring pattern connected to a sensor in the central region and the wiring pattern connected to a sensor in the peripheral region have translation symmetry with respect to each other.

6. A radiation imaging system comprising:
a radiation imaging apparatus defined in claim 1; and
a radiation source configured to generate radiation.

7. The apparatus according to claim 1, wherein, of the scintillator layer, a luminance efficiency of a part disposed over the central region and a luminance efficiency of a part disposed over the peripheral region are equal each other.

8. The apparatus according to claim 7, wherein the scintillator layer is formed on the sensor array so as to have a uniform thickness throughout the peripheral region and the central region.

9. The apparatus according to claim 1, wherein
in a case where the apparatus is irradiated with uniform radiation,
amounts of light received by the sensors disposed in the central region are uniform, and
amounts of light received by the sensors disposed in the peripheral region are smaller than the amounts of light received by the sensors disposed in the central region.

10. The apparatus according to claim 1, further comprising:
a layer for preventing leakage of light from the scintillator layer; and
an electrode located on a first side of the sensor panel,
wherein the layer covers
an upper surface of the scintillator layer,
a side surface of the scintillator layer of the first side,
a side surface of the scintillator layer of a second side of the sensor panel which is opposite to the first side, and a side surface of a substrate, on which the plurality of sensors are formed, of the second side.

11. A method for driving a radiation imaging apparatus including a sensor panel including a sensor array on which a plurality of sensors which perform photoelectric conversion are arranged in an array form and a scintillator layer provided on the sensor array, wherein the sensor array includes a peripheral region and a central region located inside the peripheral region, wherein the plurality of sensors includes sensors disposed in the central region of the sensor array and sensors disposed in the peripheral region of the sensor array, and wherein the scintillator layer is disposed over the peripheral region and the central region by direct vapor deposition or direct coating so as to have uniform luminance efficiency with respect to the sensor array, the method comprising:

reading out signals from the plurality of sensors;

generating a radiation image by performing signal processing using only the signals from sensors disposed in the central region of the sensor array; and outputting the generated radiation image.

* * * * *